United States Patent [19]
Schiffmann et al.

[11] Patent Number: 6,002,975
[45] Date of Patent: Dec. 14, 1999

[54] VEHICLE ROLLOVER SENSING

[75] Inventors: Jan Konried Schiffmann, Newbury Park, Calif.; Edward J. Wallner, Kokomo; Sachal Bhagwan Gidwani, Carmel, both of Ind.

[73] Assignee: Delco Electronics Corporation, Kokomo, Ind.

[21] Appl. No.: 09/020,140

[22] Filed: Feb. 6, 1998

[51] Int. Cl.$^6$ ..................................................... B30R 16/02
[52] U.S. Cl. .............................. 701/36; 701/38; 701/45; 701/110; 340/40; 280/756; 180/282
[58] Field of Search ............................. 701/36, 110, 45, 701/38; 340/440; 280/756; 180/282

[56] References Cited

U.S. PATENT DOCUMENTS

| 5,610,575 | 3/1997 | Gioutsos | 340/429 |
| 5,825,284 | 10/1998 | Dunwoody et al. | 340/440 |
| 5,890,084 | 3/1999 | Halasz et al. | 701/45 |

FOREIGN PATENT DOCUMENTS

| 306003 | 8/1988 | European Pat. Off. . |
| 196 06 043 A1 | 8/1997 | Germany . |
| 196 07 717 A1 | 9/1997 | Germany . |
| 196 09 176 A1 | 9/1997 | Germany . |

OTHER PUBLICATIONS

Neff, Natalie; Ward's auto world; Nov., 1996; pp. 74.
Massachusetts Inst. of Tech., Kalman filter estimation of underwater vehicle position and attitude; Sep. 1994; p. 106.
Mike Horton, Charles Kitchin, "A Dual–Axis Tilt Sensor Based on Micromachined Accelerometers", Sensors, Apr. 1996, pp. 91 and 93–94.
Steiner, Weidel, Kublbeck, Steurer, Hora, "Roll Over Detection", SAE Technical Paper Series, Feb. 24–27, 1997, pp. 45–49.
P.E.M. Frere, Problems of Using Accelerometers to Meausre Angular Rate in Automobiles:, Sensors and Actuators A. 25–27, 1991, pp. 821–824.

*Primary Examiner*—William A. Cuchlinski, Jr.
*Assistant Examiner*—Olga Hernandez
*Attorney, Agent, or Firm*—Jimmy L. Funke

[57] ABSTRACT

A rollover sensing apparatus and method are provided for predicting rollover and/or pitchover conditions of a vehicle. An angular rate sensor senses attitude rate of the vehicle, a first accelerometer measures horizontal acceleration of the vehicle, and a second accelerometer measures vertical acceleration of the vehicle. A current attitude angle is estimated with Kalman filtering and a future attitude angle is predicted at an advance time. The predicted attitude angle is compared to a threshold and an output is produced for indicating a predicted vehicle rollover condition based on the comparison. A vehicle rollover condition about the longitudinal axis of the vehicle is predicted by comparing a future roll angle to a rollover angle threshold, while a pitchover condition about the lateral axis of a vehicle is predicted by comparing a future pitch angle to a pitch angle threshold.

44 Claims, 6 Drawing Sheets

VEHICLE ROLLOVER SENSING

BACKGROUND OF THE INVENTION

The present invention generally relates to rollover sensors and, more particularly, to low-cost vehicle rollover sensors for sensing a rollover condition of a vehicle.

Future generation automotive vehicles may increasingly employ safety-related devices that deploy in the event that the vehicle rolls over to provide added protection to the occupants of the vehicle. For example, upon detecting a vehicle rollover condition, a pop-up roll bar can be deployed such that, when activated, the roll bar further extends vertically outward to increase the height of support provided by the roll bar. Other controllable features may include actuating deployment of one or more air bags, such as front or side deployment air bags, or actuating a pretensioner to pretension a restraining device, such as a seat belt or safety harness, to prevent occupants of the vehicle from ejecting from the vehicle or colliding with the roof of the vehicle.

In the past, basic rollover sensors have been employed in automotive vehicles to measure the angular position of the vehicle from which a rollover condition can be determined. The basic rollover sensors have included the use of a pendulum normally hanging vertically downward due to the earth's gravitational force. Many basic automotive sensing devices are employed simply to monitor the angular position of the vehicle relative to a level ground horizontal position. As a consequence, the basic automotive vehicle rollover sensors have generally been susceptible to error when the vehicle travels around a turn or becomes airborne, in which case the earth's gravitational force, which the sensor relies on, may be overcome by other forces.

More recently, sophisticated rollover sensing approaches have been considered. One such approach considered requires the use of six sensors including three accelerometers and three angular rate sensors, also referred to as gyros, all of which are employed together for use in an inertial navigation system which tracks position and attitude of the vehicle. The three accelerometers generally provide lateral, longitudinal, and vertical acceleration measurements of the vehicle, while the three gyros measure pitch rate, roll rate, and yaw rate. However, the more sophisticated rollover sensing approaches generally require a large number of high-precision and expensive sensors. In addition, known sophisticated systems are susceptible to cumulative drift errors, and therefore must be reset occasionally.

It is, therefore, one object of the present invention to provide for vehicle rollover sensing that requires minimal sensed measurement parameters and is relatively immune to errors generally found in conventional automotive-grade sensors. It is another object of the present invention to provide for vehicle rollover sensing for an automotive vehicle that may predict a future rollover condition in advance to allow time to deploy occupant protection measures. It is a further object of the present invention to provide for reliable vehicle rollover sensing in a low-cost sensing module.

SUMMARY OF THE INVENTION

In accordance with the teachings of the present invention, a vehicle rollover sensing apparatus and method are provided for predicting an overturn condition of a vehicle. The apparatus includes an angular rate sensor for sensing attitude rate of the vehicle and producing an output signal indicative thereof, a first accelerometer for measuring horizontal acceleration of the vehicle and producing an output signal indicative thereof, and a second accelerometer for measuring vertical acceleration of the vehicle and producing an output signal thereof. The rollover sensing apparatus further includes a controller for estimating a current attitude angle and for predicting a future attitude angle at a future point in time. The predicted attitude angle is compared to a threshold and an output is produced for indicating a predicted vehicle overturn condition based on the comparison. The vehicle rollover sensing apparatus can predict a rollover about the longitudinal axis of the vehicle by measuring roll rate, lateral acceleration, and vertical acceleration and predicting a future roll angle. The vehicle rollover sensing apparatus can also predict a pitchover about the lateral axis of the vehicle by measuring pitch rate, longitudinal acceleration, and vertical acceleration and predicting a future pitch angle.

A method is also provided for predicting an overturn condition of a vehicle. The method includes sensing attitude rate of a vehicle and producing an output signal indicative thereof, sensing horizontal acceleration of the vehicle and producing an output signal indicative thereof, and sensing vertical acceleration of the vehicle and producing an output signal indicative thereof. A current attitude angle and a current attitude acceleration are estimated, and a future attitude angle is predicted based on a weighted sum of the estimated attitude angle, measured attitude angular rate, and estimated attitude acceleration. The predicted future attitude angle is compared to a threshold value and a vehicle overturn condition signal is deployed based on the comparison. More particularly, the method predicts a vehicle rollover about the longitudinal axis of the vehicle by measuring roll rate, lateral acceleration, and vertical acceleration and predicting a future roll angle. In addition, the method predicts a pitchover condition about the lateral axis of the vehicle by measuring pitch rate and longitudinal acceleration and predicting a future pitch angle.

These and other features, objects, and benefits of the invention will be recognized by those who practice the invention and by those skilled in the art, from reading the following specification and claims, together with reference to the accompanying drawings.

DETAILED DESCRIPTION OF THE PREFERRED EMBODIMENTS

Figure 1:
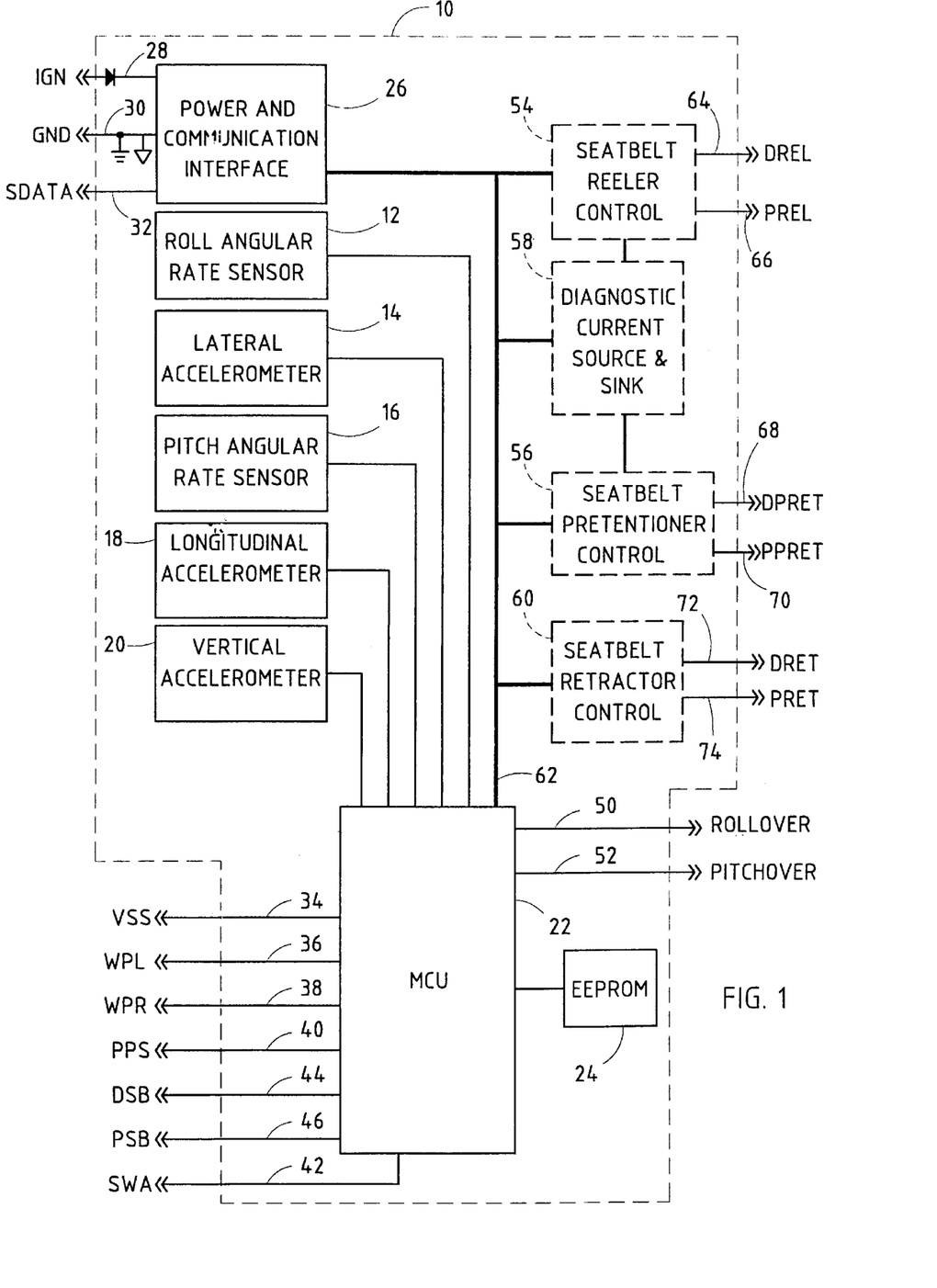
FIG. 1 is a block diagram of a rollover sensing module for sensing vehicle rollover and pitchover according to the present invention.

Referring to FIG. 1, a rollover sensing module 10 is illustrated for use in sensing vehicle roll angular rate and acceleration parameters and predicting a rollover and/or pitchover condition of an automotive vehicle (not shown). The rollover sensing module (RSM) 10 of the present invention is preferably mounted on an automotive vehicle and used to predict in advance a future rollover condition of the vehicle. A vehicle rollover condition, as described herein in connection with the present invention, may include side-to-side rotation of the vehicle about the vehicle's longitudinal axis, commonly referred to as a "vehicle rollover," and back-to-front rotation about the vehicle's lateral axis, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensing module 10 is designed to be located in an automotive vehicle to sense vehicle dynamics and predict a rollover condition of the vehicle. Upon predicting a vehicle rollover condition, the rollover sensing module 10 provides an output signal indicative of the predicted rollover condition. The rollover condition output signal may be supplied to one or more selected vehicle devices, such as safety-related devices, to actuate the selected devices in anticipation of an upcoming rollover. The predicted rollover condition output signal may be employed to deploy a pop-up roll bar to provide extended lateral support to the occupants of the vehicle just prior to the actual vehicle rollover occurring. Similarly, the predicted rollover condition output signal may actuate an occupant restraining device, such as a seat belt or safety harness pretensioner to eliminate slack in the restraining device just prior to the vehicle rollover occurring. Other controlled functions include deployment of front and/or side deployment air bags to protect the vehicle occupants during a vehicle rollover. These and other devices may be controlled in response to the rollover condition output signal.

The rollover sensing module 10 may include up to five sensors, all preferably assembled together on module 10, and oriented to perform the intended sensing operation. The sensors include a roll angular rate sensor 12, a pitch angular rate sensor 16, a lateral accelerometer 14, a longitudinal accelerometer 18, and a vertical accelerometer 20. The roll angular rate sensor 12 measures the time rate of angular roll about the vehicle's longitudinal axis, while the pitch rate sensor 16 measures the time rate of angular pitch about the vehicle's lateral axis. The lateral accelerometer 14 measures horizontal acceleration of the vehicle along the vehicle's lateral axis. The longitudinal accelerometer 18 measures horizontal acceleration of the vehicle along the vehicle's longitudinal axis. The vertical accelerometer 20 measures the vertical acceleration of the vehicle along the vehicle's vertical axis.

The rollover sensing module 10 further includes a microprocessor control unit (MCU) 22 for processing sensed vehicle parameters according to a rollover sensing algorithm to predict vehicle rollover and pitchover conditions. MCU 22 is preferably a microprocessor-based controller and, according to one example, may include Model No. HC12 made available by Motorola. Associated with MCU 22 is an electrically erasable programmable read-only memory (EEPROM) 24 that stores various programmed calibrations for performing the rollover sensing algorithm, as is explained hereinafter. The EEPROM 24 can be integrated with the MCU 22 or provided external thereto. Rollover sensing module 10 further includes a power and communication interface 26 for receiving an ignition IGN1 signal on line 28 and communicating via serial data (SDATA) on serial data bus 32. Rollover sensing module 10 is further grounded via ground line 30. Power and communication interface 26 converts an approximately 12-volt DC IGN1 signal input to 5-volts DC for use as a power supply to the components on module 10. Serial data communicated on data bus 32 may include individual sensor outputs and processor outputs as well as programmed inputs.

MCU 22 receives, as inputs, signals from each of sensors 12–20. In addition, the MCU 22 receives other various inputs that may be employed in connection with the rollover detection of the present invention. These inputs may include a vehicle speed sensor (VSS) signal 34 indicative of the speed of the vehicle and auxiliary left and right wheel position sensors (WPL) and (WPR) signals 36 and 38 for providing an indication of whether the wheels on either the left or right side of the vehicle are not in contact with the ground. The auxiliary wheel position sensors signals 36 and 38 are wheel position measurements taken relative to the body of the vehicle. Other inputs include a passenger presence (PPS) signal 40, which may be generated as a sensed output from an occupant presence sensor for purposes of sensing the presence of a passenger. A driver's seat belt (DSB) signal 44 and a passenger's seat belt (PSB) signal 46 indicate the use of driver and passenger seat belts, respectively. Also provided is a steering wheel angle (SWA) signal 42 for providing an indication of the current vehicle steering wheel angle relative to the longitudinal axis of the vehicle.

MCU 22 processes the various input signals, as will be explained hereinafter, and produces output signals identified as ROLLOVER signal 50 and PITCHOVER signal 52, which are indicative of a predicted vehicle rollover condition and a pitchover condition, respectively. In addition, MCU 22 provides the predicted rollover and pitchover output signals on line 62 to control designated onboard control devices, such as a seat belt reeler control 54, a lap seat belt pretensioner control 56, and a seat belt retractor control 60. Seat belt reeler control 54 controls the seat belt reeler for both the driver's side and passenger's side via respective signals DREL and PREL as provided on output line 64 and 66, respectively. Seat belt pretensioner control 56 likewise controls seat belt pretensioning for the driver's side and passenger's side via signals DPRET and PPRET as provided on output lines 68 and 70, respectively. A diagnostic current source and sink 58 allows for diagnostic testing of the seat belt reeler control 54 and seat belt pretensioner 56. The seat belt retractor control 60 controls retractor locks associated with the seat belt to both the driver's seat belt and passenger's seat belt via signals DRET and PRET, as provided on output lines 72 and 74.

Figure 2:
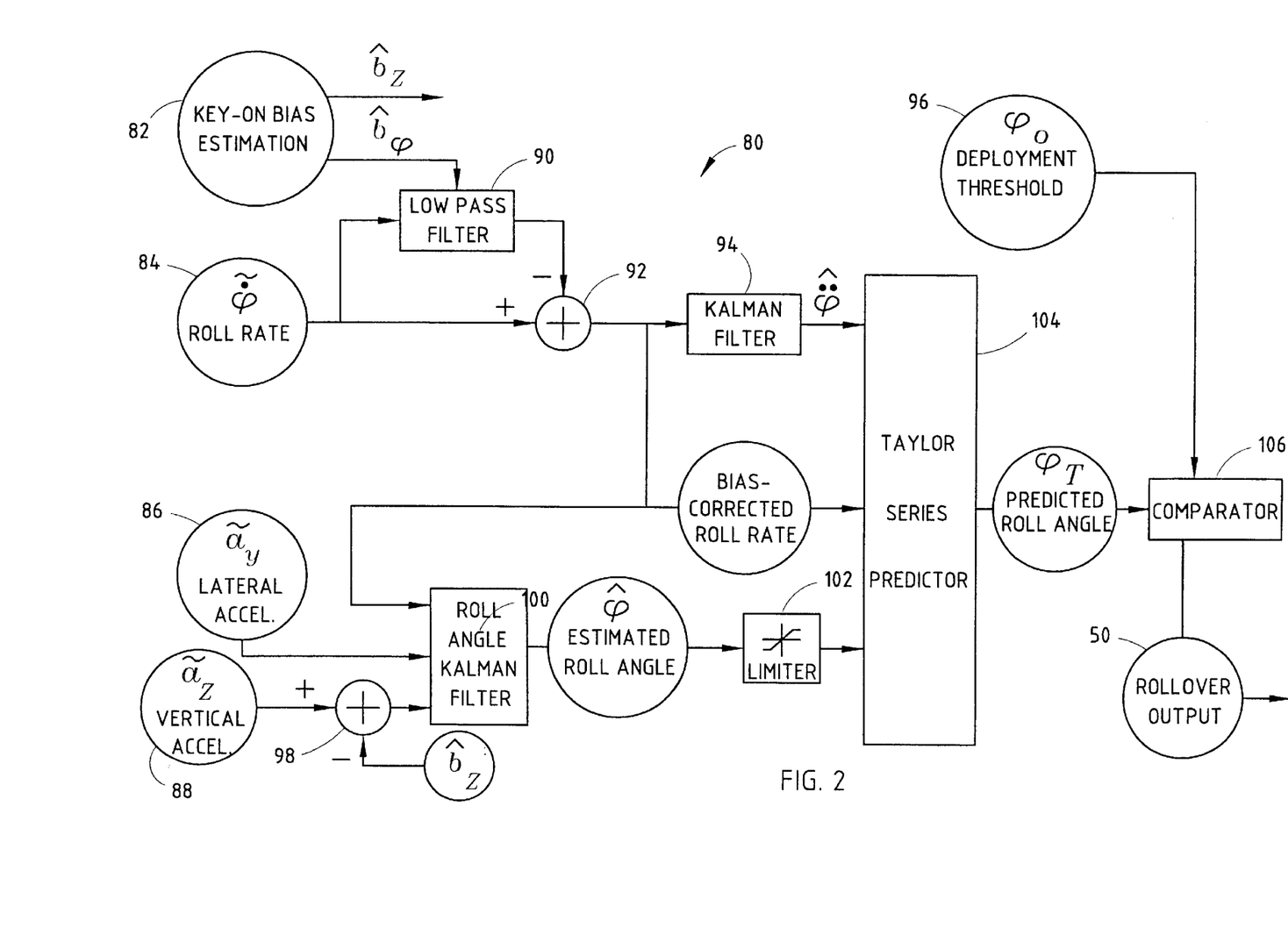
FIG. 2 is a block diagram illustrating a rollover sensing algorithm for predicting vehicle rollover with the rollover sensing module according to the present invention.

Referring to FIG. 2, a rollover prediction algorithm 80 is shown for predicting a vehicle rollover about the longitudinal axis of the vehicle. Rollover prediction algorithm 80 is preferably implemented in software that is stored in EEPROM 24 and operated upon via the microprocessor control unit 22. However, it should be appreciated that the algorithm 80 of predicting a rollover condition of a vehicle according to the present invention can be implemented in analog circuitry as well as digital processing. It should also be appreciated that while a vehicle rollover condition about the vehicle's longitudinal axis is predicted by rollover prediction algorithm 80, algorithm 80 can likewise be used to predict a vehicle pitchover about the lateral axis of the vehicle by sensing pitch angular rate and longitudinal acceleration in place of the roll angular rate and lateral acceleration, respectively.

Vehicle rollover prediction algorithm 80 receives a roll rate signal $\tilde{\phi}$ 84 from the roll angular rate sensor 12, a lateral acceleration signal $\tilde{a}_y$ 86 from the lateral accelerometer 14, and a vertical acceleration signal $\tilde{a}_z$ 88 from the vertical accelerometer 20, and processes these signals to predict a vehicle rollover condition. Generally speaking, the vehicle rollover prediction algorithm 80 requires signals generated from an angular rate sensor, a horizontal accelerometer, and a vertical accelerometer. For purposes of rollover condition about the longitudinal axis of the vehicle, the angular rate sensor is the roll angular rate sensor 12 and the horizontal accelerometer is the lateral accelerometer 14. For purposes of detecting a vehicle pitchover condition about the lateral axis of the vehicle, the angular rate sensor is the pitch angular rate sensor 16, while the horizontal accelerometer is the longitudinal accelerometer 18. Accordingly, for monitoring and predicting either a rollover or pitchover condition, algorithm 80 processes measured signals from three sensors, whereas to monitor and predict both rollover and pitchover conditions, a total of five sensors are generally employed.

Rollover prediction algorithm 80 includes a key-on bias estimation 82 for initially establishing a bias estimate of vertical acceleration $\hat{b}_z$ and a bias estimate of the roll angular rate $\hat{b}_\phi$. The key-on bias estimation 82 is preferably performed each time the vehicle is started for the first few seconds of vehicle operation, when the vehicle is presumed to be idle and located on substantially level ground. The key-on bias estimation 82 essentially averages signals from the corresponding sensors over the first few seconds following vehicle start to determine the bias in the corresponding signals. The roll angular rate bias estimate $\hat{b}_\phi$ is input as an initial condition to a low pass filter 90. Also input to low pass filter 90 is the measured roll rate $\tilde{\phi}$ measured by the roll angular rate sensor 12. The low pass filter 90 produces an average value over a designated period of time which, for example, may be two minutes. The average value output for low pass filter 90 is applied to a summing node 92 which subtracts the average value from the measured roll rate $\tilde{\phi}$. Summing node 92 establishes a bias-corrected roll rate which is input directly to a Taylor series predictor 104. The established bias-corrected roll rate is also input to a first Kalman filter 94, which generates the derivative thereof so as to produce an estimation of roll acceleration $\hat{\ddot{\phi}}$. The estimated roll acceleration $\hat{\ddot{\phi}}$ is applied as an input to the Taylor series predictor 104.

The bias-corrected roll rate is further input to a second Kalman filter 100, referred to herein as a roll angle Kalman filter. Roll angle Kalman filter 100 also receives a lateral acceleration signal $\tilde{a}_y$, which is produced by the lateral accelerometer 14. Also input to the roll angle Kalman filter 100 is a bias-corrected vertical acceleration signal which is generated by summing node 98. The bias-corrected vertical acceleration signal is produced by subtracting the vertical acceleration bias estimate $\hat{b}_z$, as produced by the key-on bias estimation 82, from a vertical acceleration signal $\tilde{a}_z$, which is produced by the vertical accelerometer 20. In effect, the roll angle Kalman filter 100 estimates the current roll angle $\hat{\phi}$ of the vehicle as a function of the vehicle's measured lateral acceleration, bias-corrected vertical acceleration, and bias-corrected roll rate.

Roll angle Kalman filter 100 is a fifth-order filter, which is based on a physical model in which the ground-based vertical acceleration is approximately equal to gravity, and in which the ground-based horizontal acceleration and the roll angle are unknowns to be estimated. The physical model of the roll angle Kalman filter 100 may be represented by the two following equations, which neglect one ground-based horizontal acceleration in the longitudinal direction for roll, assuming the ground-based vertical acceleration is equal to gravity and applying small angle approximations:

$$\tilde{a}_y = -g\phi + A_y$$

$$\tilde{a}_z = -g - A_y\phi$$

Accordingly, the measured body-based lateral acceleration $\tilde{a}_y$ is equal to the negative product of the earth's gravitational force g and roll angle $\phi$ summed with the ground-based horizontal acceleration $A_y$, while the measured body-based vertical acceleration $\tilde{a}_z$ is equal to the product of the ground-based horizontal acceleration $A_y$ and the roll angle $\phi$ subtracted from negative gravitational force g. Even though the Kalman filter signal model naturally presumes that all measurements are corrupted by noise, the estimate of roll angle $\phi$ is still sensitive to bias errors in the vertical acceleration measurement. This is because the approach to solving this problem amounts to rotating the total acceleration vector $(\tilde{a}_y + \tilde{a}_z)$ until the ground-based vertical component is equal to the gravitational force g. This can result in fairly large errors in the roll angle estimate, particularly near an angle of zero degrees.

With good sensors, the roll angle estimate $\hat{\phi}$ produced by the roll angle Kalman filter 100 should fairly accurately track the actual roll angle. On the other hand, erroneous accelerometer readings should not be allowed to falsely trigger deployment, particularly in the scenario of a non-rollover collision. For this reason, the roll angle estimate $\hat{\phi}$ is limited to an angular limit of approximately plus or minus thirty degrees (±30°) by employment of the limiter 102 prior to use in the Taylor series predictor 104. Since the triggering threshold is preferably in the neighborhood of approximately fifty degrees (50°), a sustained substantial roll rate indication is required for rollover deployment triggering. One advantage to using the roll angle Kalman filter 100 is that it increases warning time by moving the base roll angle in the Taylor series predictor 104 closer to the deployment threshold.

The Taylor series predictor 104 generates the predicted roll angle $\phi_T$ as a function of the estimated roll acceleration $\hat{\ddot{\phi}}$, the bias-corrected roll rate, and the estimated roll rate $\hat{\phi}$ as output from limiter 102. With the Taylor series predictor 104, the vehicle rollover prediction algorithm 80 predicts a roll angle $\phi_T$ an advance time T into the future. The roll angle time-history in the neighborhood of the current time is approximated by the Taylor series predictor 104, which may be approximated as follows:

$$\phi_T = \hat{\phi} + T\tilde{\phi} + \tfrac{1}{2}T^2\hat{\ddot{\phi}}$$

The Taylor series prediction of the predicted roll angle $\phi_T$ is therefore a function of the estimate of the current roll angle $\hat{\phi}$ summed with the product of the desired warning time T and the measured current value of roll rate $\tilde{\phi}$, and further summed with the product of the desired warning time squared and the estimate of the current roll acceleration $\hat{\ddot{\phi}}$ divided by two. Units for the above equation are radians, seconds, radians-per-second, and radians-per-second squared. The desired warning time may be equal to 500 milliseconds, according to one example, so that enough advance warning is provided to deploy the necessary safety restraint device prior to the actual vehicle rollover condition occurring and before the occupants are too far out of position. Accordingly, the aforementioned Taylor series prediction equation shows that the Taylor series approximation is evaluated according to an advance warning time T. While the above Taylor series prediction equation is shown as a second order equation, it should also be appreciated that a first order equation may be employed, such that the predicted roll angle ØT is equal to the estimated roll angle $\phi$ summed with the product of the desired warning time T and measured current roll rate $\hat{\dot{\phi}}$.

The absolute value of the predicted roll angle $\phi_T$ is then compared with a programmed deployment threshold $\phi_0$ by way of comparator 106. Deployment threshold $\phi_0$ is a programmed predetermined threshold value that is used to determine the prediction of a rollover condition. According to one example, deployment threshold $\phi_0$ is set equal to approximately fifty degrees (50°). Comparator 106 produces a rollover output signal 50 indicative of a predicted rollover condition, when the predicted roll angle $\phi_T$ is greater than the deployment threshold $\phi_0$. The generated rollover output signal 50 may be employed by any one or more selected devices to deploy occupant safety restraint devices or carry out other functions, as desired.

Figure 3:
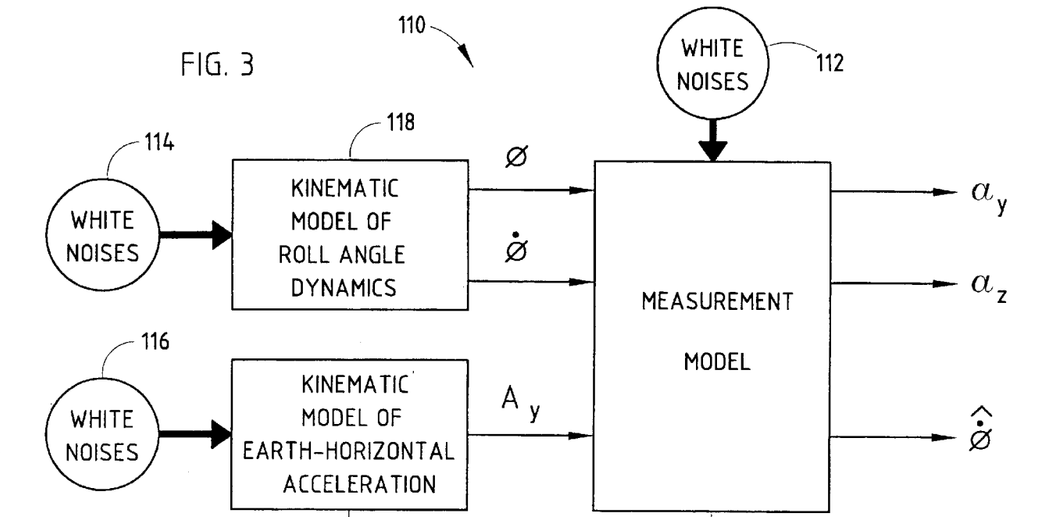
FIG. 3 is a block diagram illustrating modeling of dynamics and measurement processes for use by a roll angle Kalman filter.

The rollover and pitchover sensing of the present invention employs a modeling 110 of dynamics and measurement processes, as shown in FIG. 3, for use by the roll angle Kalman filter 100. The modeling 110 includes a kinematic model of roll angle dynamics 118, a kinematic model of earth-horizontal acceleration 120, and a measurement model 122. Each of models 118, 120, and 122 receives noise, referred to herein as "white noises." The white noises generally represent uncertainties in the variations of the quantities being modeled. With respect to the kinematic model of roll angle dynamics 118, white noises 114 represent random variations in the roll acceleration, roll rate, and roll angle. With respect to the kinematic model of earth-horizontal acceleration 120, white noises 116 represent random variations in the rate at which the earth-horizontal acceleration is changing and in the earth-horizontal acceleration itself. With respect to the measurement model 122, the white noises 112 represent random noises in the measurement of each of the quantities that are being measured, including lateral acceleration, vertical acceleration, and roll angular rate, when attending a rollover condition. The measurement is modeled as being whatever the true values of those measured values are, plus some unknown noise value.

The kinematic model of roll angle dynamics 118 produces a roll angle $\phi$ and roll rate $\dot{\phi}$, both of which are input to the measurement model 122. The roll angle $\phi$ and roll rate $\dot{\phi}$ are modeled quantities which take into consideration the white noises 114. The kinematic model of earth-horizontal acceleration 120 produces an earth-horizontal acceleration value $A_y$ which is also input to measurement model 122. Earth-horizontal acceleration value $A_y$ is a modeled quantity that is induced with white noises 116. Measurement model 122 produces both a body-lateral acceleration $a_y$ and a body-vertical acceleration $a_z$ based on: (a) the earth-vertical acceleration equalling the earth's gravity; (b) the vector sum of earth-vertical and earth-horizontal accelerations rotated through a presumed roll angle $\phi$ to produce body-based projection components (i.e., body-lateral and body-vertical accelerations); and (c) the small angle approximations being valid. In addition, the measurement model 122 produces a roll rate $\hat{\dot{\phi}}$ as a third measured quantity. The roll angle Kalman filter 100 estimates the quantities appearing inside the kinematic model 110, including, in particular, roll angle $\phi$, based on the measured values of the measured quantities.

Figure 4:
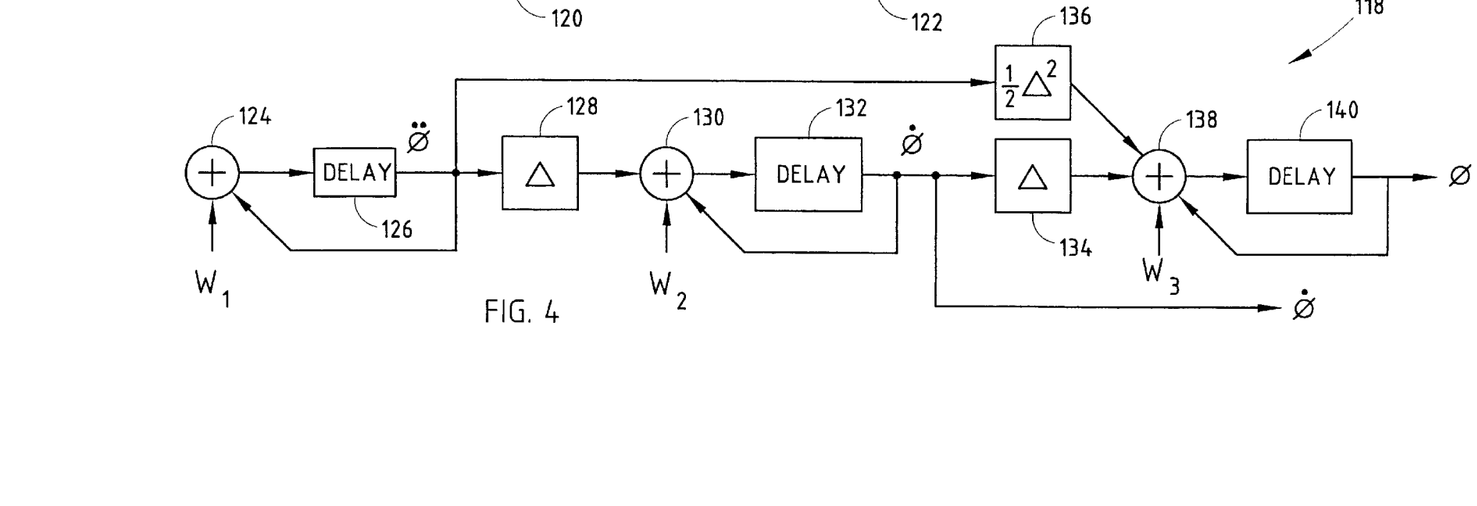
FIG. 4 is a block diagram illustrating a kinematic model of roll angle dynamics for use in the roll angle Kalman filter model of FIG. 3.

With particular reference to FIG. 4, the kinematic model of roll angle dynamics 118 is further shown in greater detail therein. Roll angle dynamics kinematic model 118 is a third order model which receives independent white noise sequences $W_1$, $W_2$, and $W_3$, all of which are provided by white noises 114. Summing junction 124 sums noise $W_1$ with the previous roll acceleration $\ddot{\phi}$ which is delayed via delay 126. Roll acceleration $\ddot{\phi}$ is integrated via multiplier 128 and summing junction 130 and produces an integrated output. Multiplier 128 has a multiplication factor set equal to the Kalman filter loop time. Summing junction 130 sums the multiplier 128 output with noise $W_2$ and the previous roll rate $\dot{\phi}$ which is delayed via delay 132. Roll rate $\dot{\phi}$ is provided as one output and is also integrated via multiplier 134, summing junction 138, and block 136. Summing junction 138 sums the output of multiplier 134 with white noise $W_3$, the product of one-half the loop time square, as determined by block 136 and the roll acceleration $\ddot{\phi}$, and the previous roll angle $\phi$ as delayed by delay block 140. Roll angle $\phi$ is provided as a second output.

Figures 5, 6:
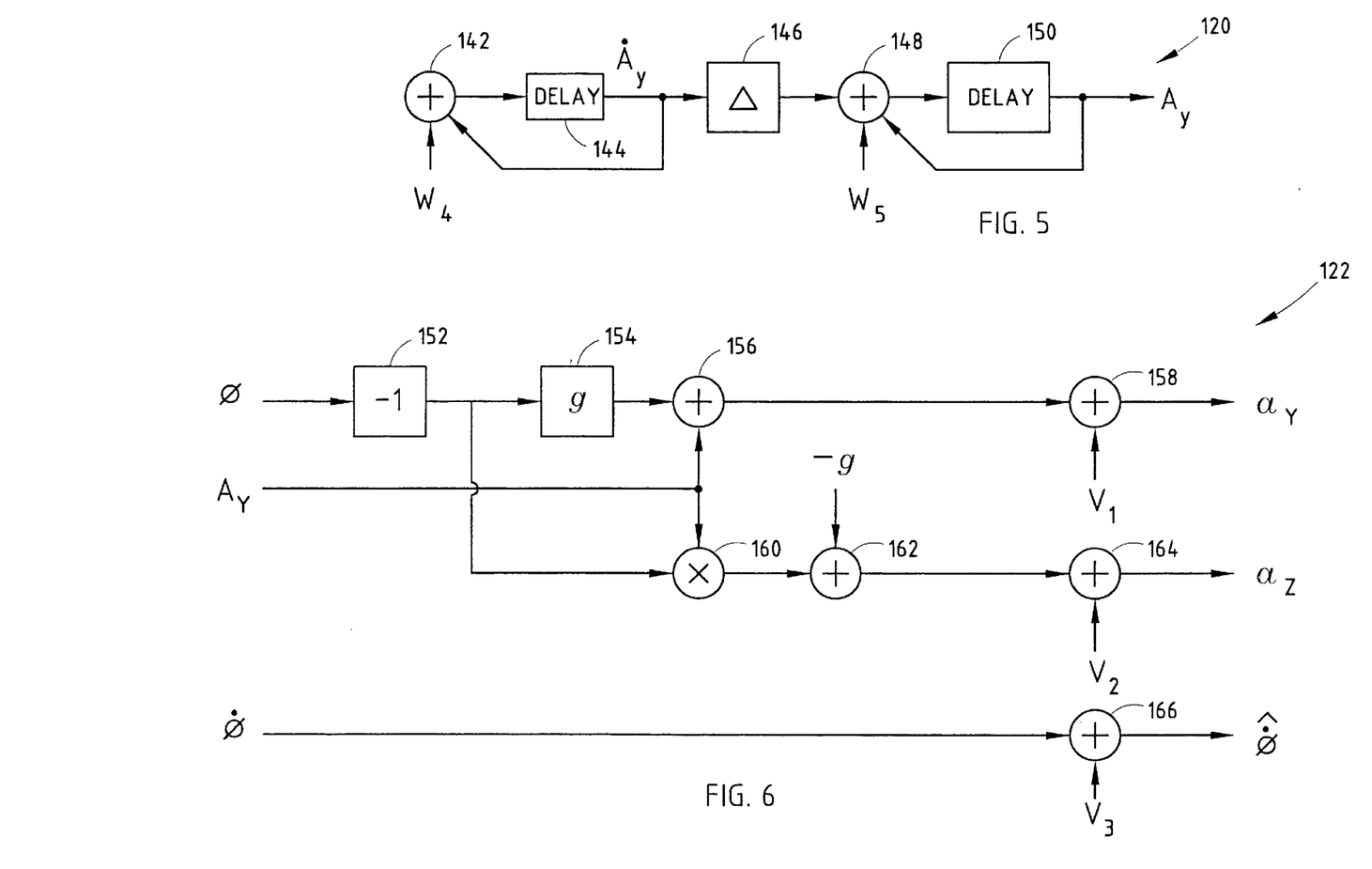
FIG. 5 is a block diagram illustrating a kinematic model of earth-horizontal acceleration for use in the roll angle Kalman filter model of FIG. 3.
FIG. 6 is a block diagram illustrating a measurement model for use in the roll angle Kalman filter model of FIG. 3.

Referring to FIG. 5, the kinematic model of earth-horizontal acceleration 120 of FIG. 3 is further illustrated as a second order model. Kinematic model of earth-horizontal acceleration 120 sums white noise $W_4$ via summing junction 142 with the previous derivative acceleration $\dot{A}_y$ (e.g., jerk) which is delayed via delay 144. The rate of change of acceleration $\dot{A}_y$ is integrated via multiplier 146 and summing junction 148. The multiplier 146 output is summed via summing junction 148 with noise $W_5$ and the previous earth-horizontal acceleration $A_y$ as delayed via delay 150. The earth-horizontal acceleration $A_y$ is provided as an output of kinematic model 120.

With particular reference to FIG. 6, the measurement model 122 is further illustrated therein in detail. Measurement model 122 receives and inverts the roll angle $\phi$ via inverter 152 and multiplies the inverted roll angle by the earth's gravity acceleration g in multiplier 154. The multiplier 154 output is summed via summing junction 156 with the earth-horizontal acceleration $A_y$. The output of summing junction 156 is summed with white noise $V_1$ via summing junction 158 to produce the body-horizontal acceleration $a_y$. Measurement model 122 further includes a multiplier 160 for multiplying the earth-horizontal acceleration $A_y$ with the inverted output of inverter 152. The output of multiplier 160 is summed with the negative of earth's gravity acceleration g via summing junction 162. The summed output of summing junction 162 is summed with noise $V_2$ via summing junction 164 to produce the body-vertical acceleration $a_z$. Furthermore, measurement model 122 receives roll rate $\dot{\phi}$ which is summed via summing junction 166 with noise $V_3$ to produce the roll rate $\hat{\dot{\phi}}$.

Figure 7:
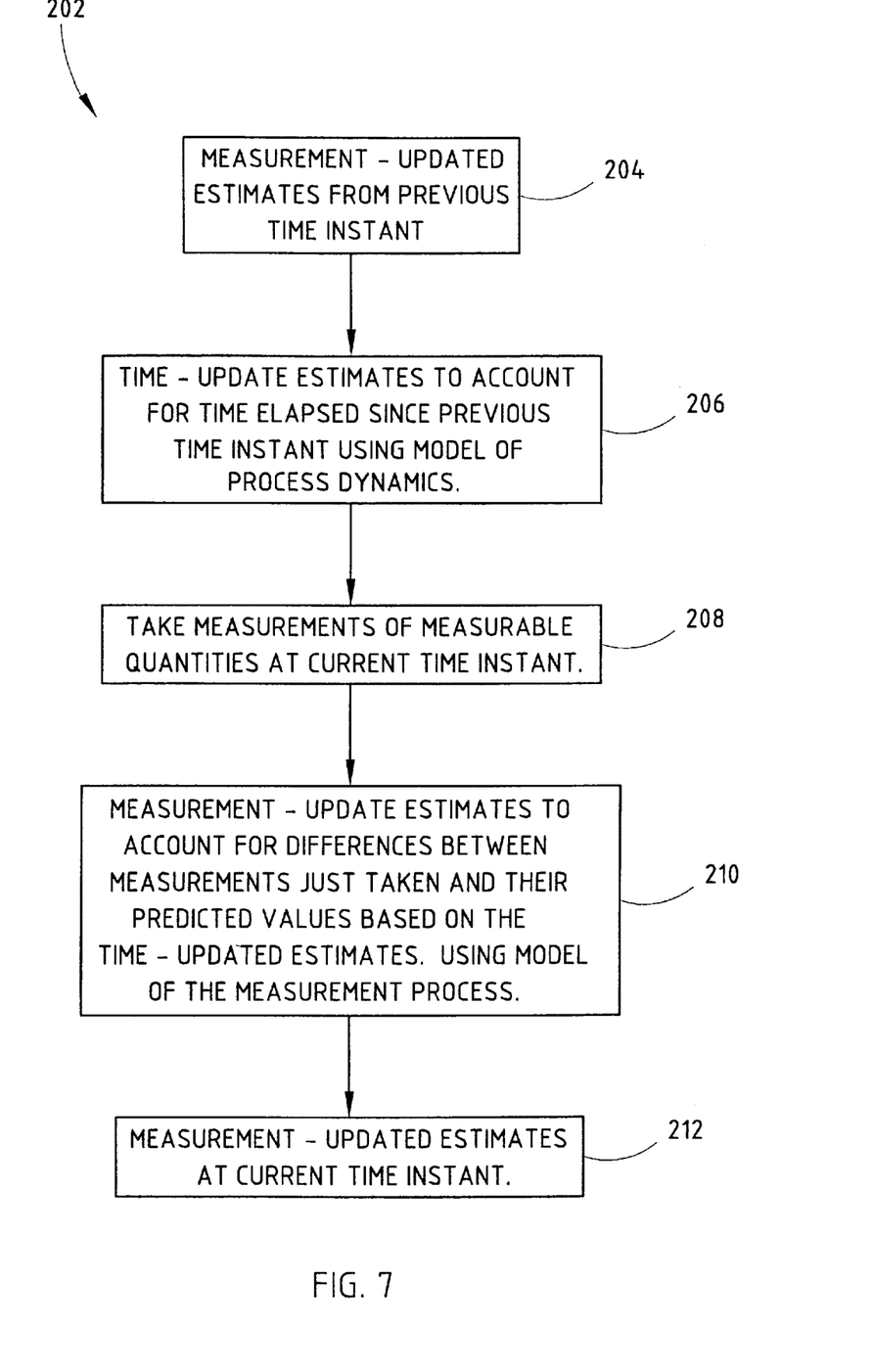
FIG. 7 is a flow diagram generally illustrating processing steps of the roll angle Kalman filter.

The roll angle Kalman filter 100 of the present invention performs both the time-update roll angle Kalman filter estimates as well as the measurement-update roll angle Kalman filter estimates. Referring to FIG. 7, a methodology 202 of processing information in accordance with the roll angle Kalman filter 100 is provided therein. Methodology 202 includes receiving measurement-updated estimates from the previous time instant pursuant to block 204. The estimates are time-updated to account for time that has elapsed since the previous time instant using the model of process dynamics as provided in block 206. Proceeding to block 208, methodology 202 takes measurements of measurable quantities at the current time instant. Proceeding to block 210, the estimates are measurement-updated to account for differences between measurements just taken and their predicted values based on the time-updated estimates using the model of measurement process. Referring to block 212, measurement-updated estimates at the current time instant are provided.

Figure 8:
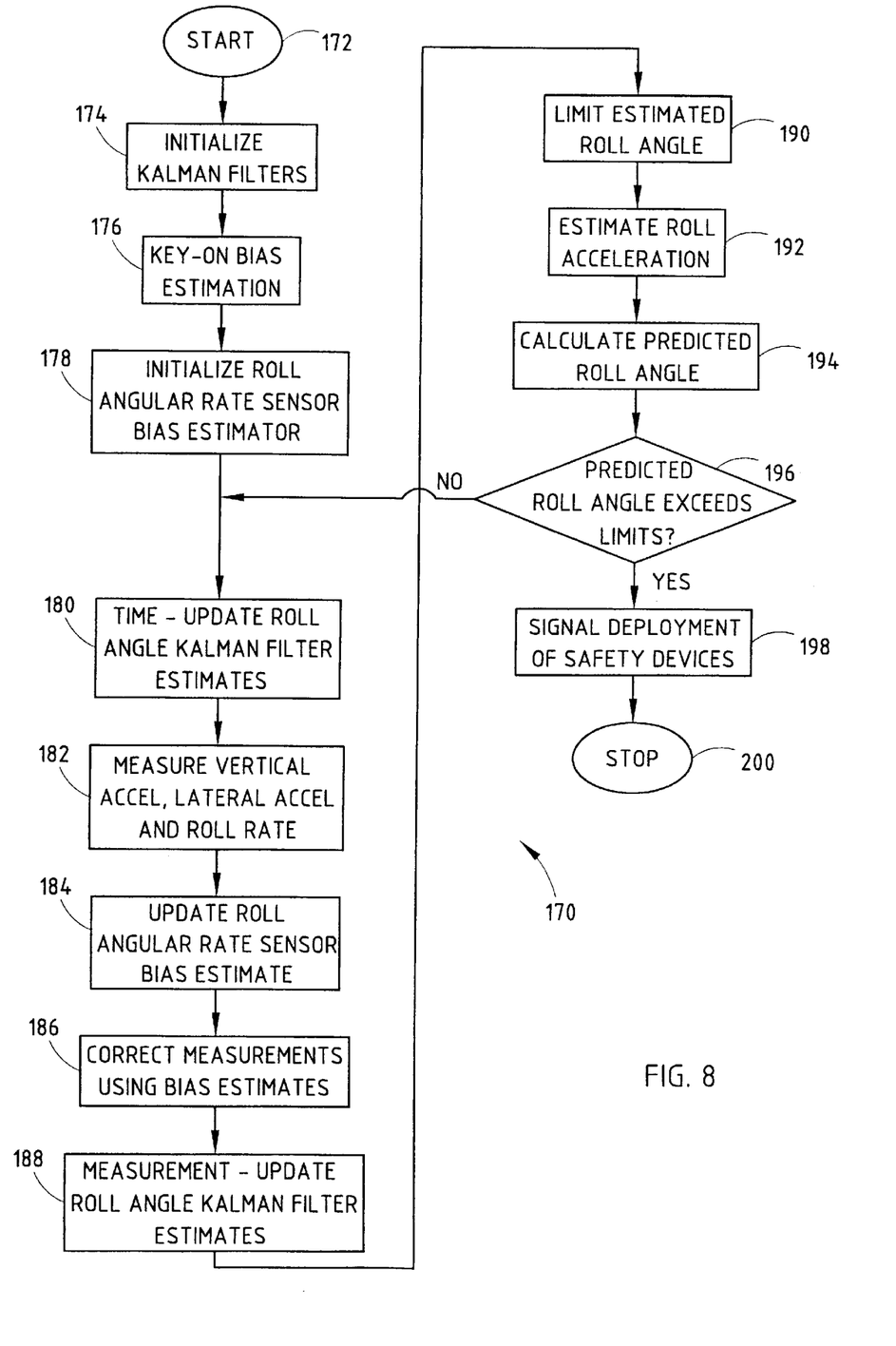
FIG. 8 is a flow diagram illustrating a methodology for sensing a rollover condition of a vehicle according to the present invention.

Referring to FIG. 8, a rollover prediction methodology 170 is shown for predicting a vehicle rollover condition and deploying one or more safety devices in response thereto. Rollover prediction methodology 170 begins with start block 172 and proceeds to initialize the Kalman filters, particularly Kalman filters 94 and 100, pursuant to block 174. The initialization includes initializing all variables to zero or other appropriate values based on available prior information, such as a known value of the roll angle. Methodology 170 proceeds to key-on bias estimation block 176 to perform the key-on bias estimation 82. When the vehicle's ignition is keyed on, the vertical accelerometer 20 and roll angular rate sensor 12 are allowed to stabilize and warm up for a short period of time. Then, for a time period of approximately one or two seconds, the output of each sensor is averaged to obtain a presumed bias level of preferably zero offset. Next, the angular rate sensor bias estimator is initialized pursuant to block 178. The roll angular rate bias estimator is a low-pass filter, which essentially estimates the roll angle rate signal over the last one or two minutes. This average value is taken to be the bias level for the roll angular rate sensor 12 and is initialized to the key-on bias estimation value.

With the use of the roll angle Kalman filter 100, the Kalman filter estimates are time-updated pursuant to block 180. The roll angle Kalman filter 100 estimates the roll angle, roll rate, roll acceleration, the earth-horizontal acceleration, and its time derivative. The time-updating uses the model of the dynamics of the process involving the quantities being estimated. The time-updating changes the estimates to account for the time which has elapsed since the last estimates were made, i.e., one loop time ago.

Next, rollover prediction methodology 170 proceeds to measure vertical acceleration, lateral acceleration, and roll rate, as these values are output by the appropriate sensors and recorded. The roll angular rate sensor bias estimate is updated pursuant to block 184. The roll angular rate sensor bias estimator low-pass filter is updated using the new roll rate measurement. In block 186, the corrected measurements using bias estimates are obtained by subtracting out the corresponding estimated bias values from the measured values of roll rate and vertical acceleration to provide bias-corrected values. The estimates contained in the roll angle Kalman filter 100 are updated using the current bias-corrected measurements according to the roll angle Kalman filter 100, as shown in block 188. The measurement-updating changes the estimates to account for differences between the current measurements and their predicted values based on the current estimates.

Proceeding to block 190, methodology 170 limits the roll angle estimate output from the roll angle Kalman filter 100 so that the magnitude thereof does not exceed a calibration threshold. Proceeding to block 192, methodology 170 estimates roll acceleration. The first Kalman filter 94 is used to estimate the derivative of the bias-corrected measured roll rate signal to provide an estimated roll acceleration. Methodology 170 calculates the predicted roll angle by taking a weighted sum of the estimated roll angle, the bias-corrected roll rate, and the estimated roll acceleration, pursuant to block 194. The weights provided in the weighted sum are preferably calibrations. Once the predicted roll angle is calculated, the predicted roll angle is compared to the limits of the programmed calibration threshold $\phi_0$ as shown in decision block 196. If the roll angle limits are not exceeded, methodology returns to block 180. If the predicted roll angle exceeds the programmed threshold $\phi_0$, methodology 170 produces a rollover condition output indicative of a predicted vehicle rollover. The predicted rollover output may then signal deployment of safety-restraint devices, as provided in block 198, so as to actuate, for example, a pop-up roll bar, a seat belt pretensioner, an air bag, or other selected devices. Following signalling of the deployment of the devices, methodology 170 is complete pursuant to stop block 200.

When used to deploy a safety-related function of the vehicle, the rollover condition prediction methodology 170 may be employed to deploy a non-reusable device. However, it should be appreciated that a resettable rollover condition sensing apparatus may be achieved to repeatedly deploy one or more devices without departing from the teachings of the present invention.

Accordingly, the rollover sensing apparatus and method of the present invention provides a prediction of a rollover condition of a vehicle prior to the actual complete occurrence of a vehicle rollover so that selected devices may be deployed in a timely fashion to provide added protection to occupants of the vehicle. The rollover sensing apparatus of the present invention is relatively immune to substantial errors present in automotive-grade sensors and, therefore, provides enhanced rollover sensing for use with automotive-grade sensors, as well as reducing the number of sensors that may otherwise be required in previously known approaches.

Additionally, while the rollover sensing module 10 has been described herein particularly in connection with the rollover prediction algorithm 80, as set forth in FIG. 2, and the methodology 170 for predicting a rollover condition, as set forth in FIG. 8, about the longitudinal axis of the vehicle, algorithm 80 and methodology 170 as processed by the rollover sensing module 10 may likewise be used to predict a pitchover condition about the lateral axis of the vehicle. In so doing, algorithm 80 would receive a pitch rate signal from pitch angular rate sensor 16 instead of the roll rate signal, and would further receive a longitudinal acceleration signal from the longitudinal accelerometer 18 instead of the lateral accelerometer 14. Algorithm 80 would proceed to estimate pitch acceleration, bias-corrected pitch rate, and an estimated pitch angle for use in the Taylor series predictor to generate a predicted pitch angle. The predicted pitch angle would then be compared with a deployment threshold value to predict a pitchover condition of the vehicle. Accordingly, the rollover sensing module 10 and rollover prediction algorithm 80 of the present invention may be employed to predict a rollover condition and/or a pitchover condition of a vehicle.

Additionally, the rollover sensing module 10 and rollover prediction algorithm 80 of the present invention may further utilize the vehicle speed sensor (VSS) signal and/or wheel position sensor (WPL and WPR) signals for use in detection of a rollover and/or pitchover condition of a vehicle. The vehicle speed sensor signal, under some conditions, can be employed to provide an accurate representation of the vehicle's actual longitudinal acceleration. This allows for the pitch angle to be estimated under the assumption that the difference in longitudinal accelerations derived from the vehicle speed sensor and the longitudinal accelerometer is due to a gravitational component. In addition, knowledge that the vehicle is stopped can aid in the estimation of rollover sensor biases, particularly the angular rate sensor biases. If an inclinometer is made available, the accelerometer biases could also be estimated when the vehicle is known to be stopped. Further, in a situation where models of vehicle dynamics are used in the rollover algorithm, knowledge of the vehicle's speed, obtained from the vehicle speed sensor, would further aid in the rollover condition prediction of the present invention.

The left and right wheel position sensor (WPL and WPR) signals indicate the distance between each wheel center and the vehicle body. The wheel position sensor signals could be used to reduce the incidence of false deployments. The vehicle's suspension springs exert a strong force pushing the wheels away from the vehicle body, such that only contact with the ground keeps the wheels near the body. Centrifugal forces which are present in a rollover situation also work to pull the wheels away from the body. Since a vehicle generally does not rollover without one or more wheels leaving the ground, rollover deployment could be disabled unless at least one wheel is sufficiently far away from the vehicle body as detected by the wheel position sensors. Accordingly, the rollover sensing module 10 and rollover prediction algorithm 80 may utilize the wheel position sensors to provide a predicted rollover and/or pitchover condition output only if either the left or right side wheels of the vehicle are detected as having left the ground.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A rollover sensing apparatus for predicting an overturn condition for a vehicle, comprising:
   an angular rate sensor for sensing attitude rate of a vehicle and producing an output signal indicative thereof;
   a first accelerometer for measuring horizontal acceleration of the vehicle and producing an output signal indicative thereof;
   a second accelerometer for measuring vertical acceleration of the vehicle and producing an output signal indicative thereof;
   a controller for receiving said signals from said angular rate sensor, said first accelerometer, and said second accelerometer and for estimating a current attitude angle, said controller further predicting a future attitude angle as a function of said estimated current attitude angle and said sensed attitude rate, and comparing said predicted future attitude angle to a threshold value; and
   an output for deploying a vehicle overturn condition output based on said comparison.

2. The apparatus as defined in claim 1, further comprising a Kalman filter for estimating said attitude angle.

3. The apparatus as defined in claim 1, further comprising means for selecting an advance time for predicting said future rollover angle.

4. The apparatus as defined in claim 1, wherein said controller further comprises a Taylor series-based predictor for providing said prediction of a future attitude angle.

5. The apparatus as defined in claim 1, further comprising a bias estimator for estimating bias in said input signals and further subtracting said bias from current received signals.

6. The apparatus as defined in claim 1, wherein said controller further estimates an attitude acceleration and predicts said future attitude angle further as a function of said estimated attitude acceleration.

7. The apparatus as defined in claim 1, wherein said angular rate sensor senses roll rate of the vehicle and said first accelerometer measures lateral acceleration of the vehicle, said controller predicting a future roll angle and comparing said predicted future roll angle to said threshold value to predict a rollover condition of said vehicle about a longitudinal axis of the vehicle.

8. The apparatus as defined in claim 1, wherein said angular rate sensor comprises a pitch rate sensor for sensing pitch rate of said vehicle and said first accelerometer measures longitudinal acceleration of the vehicle, said controller predicting a future pitch rate and comparing said predicted future pitch rate to said threshold value so as to predict a future pitchover condition of said vehicle about a lateral axis of the vehicle.

9. The apparatus as defined in claim 1, wherein said controller includes a microprocessor.

10. A rollover sensing apparatus for predicting an rollover condition for a vehicle, comprising:
    a roll rate sensor for sensing roll rate about a horizontal axis of a vehicle and producing an output signal indicative thereof;
    a first accelerometer for measuring lateral acceleration of the vehicle and producing an output signal indicative thereof;
    a second accelerometer for measuring vertical acceleration of the vehicle and producing an output signal indicative thereof;
    a controller for receiving said signals from said angular roll rate sensor, said first accelerometer, and said second accelerometer and for estimating a current roll angle, said controller further predicting a future roll angle based on said estimated current roll angle and said sensed roll rate, and comparing said predicted future roll angle to a threshold value; and
    an output for deploying a vehicle rollover condition output based on said comparison.

11. The apparatus as defined in claim 10, further comprising a Kalman filter for estimating said roll angle.

12. The apparatus as defined in claim 10, wherein said controller comprises a Taylor series-based predictor for providing said prediction of a future roll angle.

13. The apparatus as defined in claim 10, wherein said controller further estimates a roll acceleration and predicts said future roll angle further as a function of said estimated roll acceleration.

14. The apparatus as defined in claim 10, further comprising:
    an angular pitch rate sensor for sensing pitch rate about a lateral axis of the vehicle and producing an output signal indicative thereof;
    a third accelerometer for measuring longitudinal acceleration of the vehicle and producing an output signal indicative thereof, wherein said controller further receives said signals from said angular pitch rate sensor and said third accelerometer and further predicts a future pitch angle and compares said predicted future pitch angle to a threshold value to predict a future pitchover condition of the vehicle.

15. A rollover sensing apparatus for predicting a pitchover condition of a vehicle, comprising:
    an angular pitch rate sensor for sensing pitch rate about a lateral axis of a vehicle and producing an output signal indicative thereof;
    a first accelerometer for measuring longitudinal acceleration of the vehicle and producing an output signal indicative thereof;

a second accelerometer for measuring vertical acceleration of the vehicle and producing an output signal indicative thereof;

a controller for receiving said signals from said angular pitch rate sensor, said first accelerometer, and said second accelerometer, and for estimating a current pitch angle, said controller further predicting a future pitch angle as a function of said estimated current pitch angle and said sensed pitch rate, and comparing said predicted future pitch angle to a threshold value; and an output for deploying a vehicle pitchover condition based on said comparison.

16. The apparatus as defined in claim 15, further comprising a Kalman filter for estimating said pitch angle.

17. The apparatus as defined in claim 15, wherein said controller further comprises a Taylor series-based predictor for providing said prediction of said future pitch angle.

18. The apparatus as defined in claim 15, wherein said controller further receives a vehicle speed signal.

19. The apparatus as defined in claim 15, wherein said controller further estimates a pitch acceleration and predicts said future pitch angle further as a function of said estimated pitch acceleration.

20. An apparatus for estimating a current attitude angle of a vehicle comprising:

an angular rate sensor for sensing attitude rate of a vehicle and producing an output signal indicative thereof;

a first accelerometer for measuring horizontal acceleration of the vehicle and producing an output signal indicative thereof;

a second accelerometer for measuring vertical acceleration of the vehicle and producing an output signal indicative thereof; and a controller for receiving said signals from said angular rate sensor, said first accelerometer, and said second accelerometer, said controller including a Kalman filter for estimating a current attitude angle.

21. The apparatus as defined in claim 20, wherein said angular rate sensor senses roll rate of the vehicle and said first accelerometer measures lateral acceleration of the vehicle, said controller estimating a current roll angle.

22. The apparatus as defined in claim 20, wherein said angular rate sensor comprises a pitch rate sensor for sensing pitch rate of said vehicle and said first accelerometer measures longitudinal acceleration of the vehicle, said controller estimating a future pitch angle of the vehicle.

23. A method for predicting an overturn condition of a vehicle, said method comprising the steps of:

sensing attitude rate of a vehicle and producing an output signal indicative thereof;

sensing horizontal acceleration of the vehicle and producing an output signal indicative thereof;

sensing vertical acceleration of the vehicle and producing an output signal indicative thereof;

estimating a current attitude angle;

predicting a future attitude angle based on said estimated current attitude angle and said sensed attitude rate;

comparing said predicted future attitude angle to a threshold value; and deploying a vehicle overturn condition signal based on said comparison.

24. The method as defined in claim 23, wherein said step of estimating said attitude angle includes Kalman filtering.

25. The method as defined in claim 23, wherein said step of predicting a future attitude angle comprises performing a Taylor series-based prediction.

26. The method as defined in claim 25, further comprising the step of selecting an advance time for predicting said future rollover angle.

27. The method as defined in claim 23, further comprising the step of estimating bias and said input signals and further subtracting said bias from current received signals.

28. The method as defined in claim 23, further comprising the step of estimating a current attitude acceleration and predicting said future attitude angle further as a function of said estimated current attitude acceleration.

29. The method as defined in claim 23, wherein said step of sensing attitude rate comprising sensing roll rate about a longitudinal axis of said vehicle and said step of sensing horizontal acceleration comprises sensing lateral acceleration of said vehicle, wherein said controller predicts a future roll angle and compares said predicted future roll angle to said threshold value to predict a rollover condition of said vehicle about a longitudinal axis of said vehicle.

30. The method as defined in claim 23, wherein said step of sensing attitude rate comprises sensing pitch rate about a lateral axis of said vehicle and sensing horizontal acceleration comprises sensing longitudinal acceleration of said vehicle, wherein a future pitch rate is predicted and compared to said threshold value so as to predict a future pitchover condition of said vehicle about a lateral axis of the vehicle.

31. A method for predicting a rollover condition of a vehicle, said method comprising the steps of:

sensing roll rate about a horizontal axis of a vehicle and producing an output signal indicative thereof;

sensing lateral acceleration of said vehicle and producing an output signal indicative thereof;

sensing vertical acceleration of said vehicle and producing an output signal indicative thereof;

estimating a current roll angle;

predicting a future roll angle based on said estimated current roll angle and said sensed roll rate;

comparing said predicted future roll angle to a threshold value; and deploying a vehicle overturn condition signal based on said comparison.

32. The method as defined in claim 31, wherein said step of estimating said roll angle comprises performing Kalman filtering.

33. The method as defined in claim 31, wherein said step of predicting a future roll angle comprises performing a Taylor series-based prediction.

34. The method as defined in claim 33, further comprising the step of selecting an advance time for predicting said future rollover angle.

35. The method as defined in claim 33, further comprising the step of estimating a current roll acceleration and predicting said future roll angle further based on said estimated current roll acceleration.

36. The method as defined in claim 31, further comprising the steps of:

sensing a pitch rate about a lateral axis of said vehicle and producing an output signal indicative thereof;

sensing a longitudinal acceleration of said vehicle and producing an output signal indicative thereof;

estimating a current pitch angle;

predicting a future pitch angle based on said estimated current patent angle and said sensed pitch rate;

comparing said predicted future pitch angle to a threshold value; and deploying a vehicle pitchover condition signal based on said comparison.

37. A method for predicting a pitchover condition of a vehicle, said method comprising the steps of:

sensing pitch rate about a lateral axis of a vehicle and producing an output signal indicative thereof;

sensing longitudinal acceleration of said vehicle and producing an output signal indicative thereof;

sensing vertical acceleration of said vehicle and producing an output signal indicative thereof;

estimating a current pitch angle;

predicting a future pitch angle based on said estimated current pitch angle and said sensed pitch rate;

comparing said predicted future pitch angle to a threshold value; and deploying a vehicle pitchover condition signal based on said comparison.

38. The method as defined in claim 37, wherein said step of estimating said pitch angle comprises performing Kalman filtering.

39. The method as defined in claim 37, wherein said step of predicting said future pitch angle comprises performing a Taylor series-based prediction.

40. The method as defined in claim 37, further comprising the step of receiving a vehicle speed signal.

41. The method as defined in claim 37, further comprising the step of estimating a current pitch acceleration and predicting said future pitch angle further based on said estimated current pitch acceleration.

42. A method of estimating a current attitude angle of a vehicle, said method comprising the steps of:

sensing attitude rate of a vehicle and producing an output signal indicative thereof;

sensing horizontal acceleration of the vehicle and producing an output signal indicative thereof;

sensing vertical acceleration of the vehicle and producing an output signal indicative thereof;

processing said sensed signals with a Kalman filter so as to estimate a current attitude angle of the vehicle.

43. The method as defined in claim 42, wherein said step of sensing attitude rate comprises sensing roll rate of a vehicle and said step of sensing horizontal acceleration comprises sensing lateral acceleration of said vehicle, and said step of estimating a current attitude angle comprises estimating a current roll angle of said vehicle.

44. The method as defined in claim 42, wherein said step of sensing attitude rate comprises sensing pitch rate of the vehicle, said step of sensing horizontal acceleration comprises sensing longitudinal acceleration of said vehicle, and said step of estimating a current attitude angle comprises estimating a current pitch angle of said vehicle.

* * * * *